H. STRACHAN & G. P. SCHMIDT.
FRUIT HANDLING MACHINE.
APPLICATION FILED DEC. 3, 1910.
1,060,376.
Patented Apr. 29, 1913.
2 SHEETS—SHEET 1.
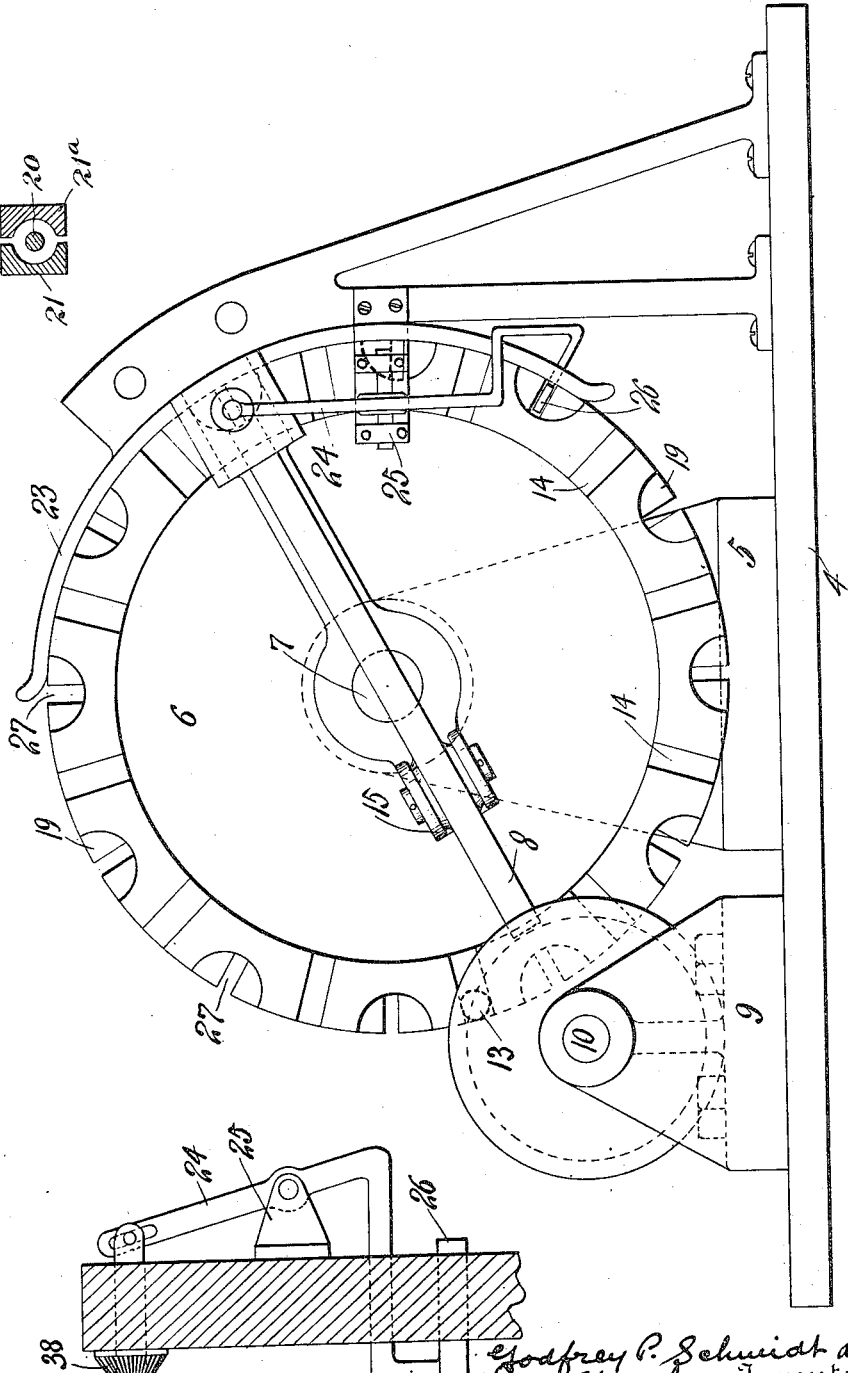

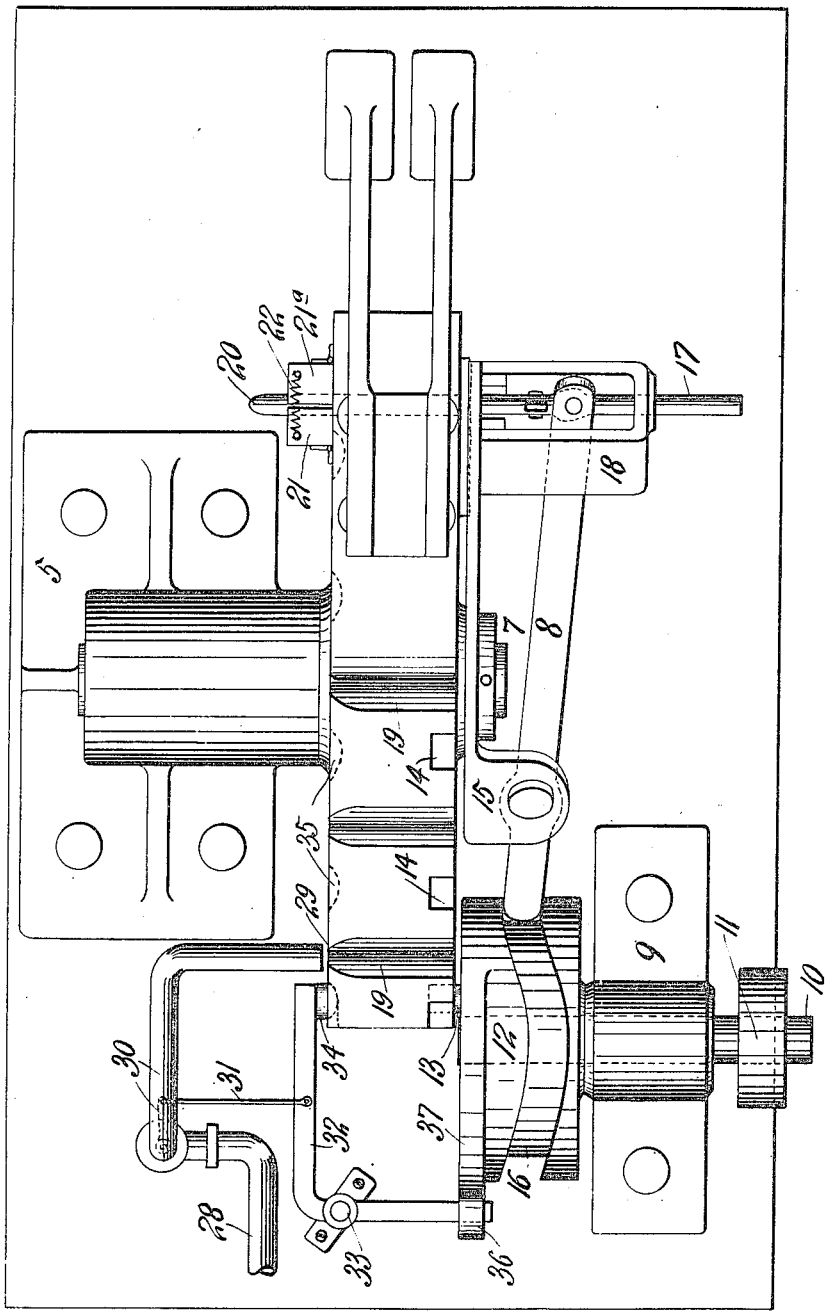

UNITED STATES PATENT OFFICE.

HARRY STRACHAN AND GODFREY P. SCHMIDT, OF NEW YORK, N. Y.; SAID SCHMIDT ASSIGNOR TO SAID STRACHAN.

FRUIT-HANDLING MACHINE.

1,060,376.  Specification of Letters Patent.  Patented Apr. 29, 1913.

Application filed December 3, 1910. Serial No. 595,521.

*To all whom it may concern:*

Be it known that we, HARRY STRACHAN and GODFREY P. SCHMIDT, citizens of the United States, residing at New York city, in the county of New York and State of New York, have invented certain new and useful Improvements in Fruit-Handling Machines, of which the following is a specification, reference being had therein to the accompanying drawing.

Our invention relates to improvements in pitting apparatus and is particularly adapted for and is illustrated in the accompanying drawings for extracting the pits from dates although it will be understood of course that prunes and other fruit can be pitted with an apparatus of like character.

Referring to the accompanying drawings, Figure 1 illustrates in side elevation a suitable machine embodying one modification of the invention. Fig. 2 is a plan view of the same, Fig. 3 is a detail partly in section illustrating the meat ejecting device, and Fig. 4 is an enlarged cross section of the jaws between which the pits are ejected.

4 is the base of the machine and 5 the standard upon which the wheel 6 is mounted. The bearing 7 of this wheel also serves as a bearing for the lever 8 which ejects the pits from the fruit. 9 is another standard provided with the bearing 10 upon which the driving pulley 11 is mounted. Upon the axis 10 is also mounted the cam 12 provided with the pin 13 which engages the openings or indentations 14 in the face of the wheel 6 so that as the cam 12 is revolved, the fruit carrying wheel 6 is intermittently rotated by the pin 13 which successively engages the recesses or indentations 14. At the same time the lever 8 mounted in the bearing 15 supported upon the main shaft 7 is reciprocated in the groove 16 of the cam 12. This causes the plunger 17 mounted in the housing 18 to traverse or penetrate the peripheral pockets 19 successively in such a manner that the plunger 17 strikes the pit 20 in the center of the fruit ejecting it through the jaws 21—21ª the interiors of which conform to the sides of the pit and which are retained closed by resilient means preferably such as the spring 22, the tapered formation of the pockets 19 serving as a guide to direct the pit of the fruit. 23 is a guide or guard to keep the fruit within the pockets. 24 is another lever pivotally mounted at the end of the plunger 17 and having its bearing in the bracket 25 and provided with a zigzag extremity as shown terminating in the plunger 26. As the plunger 17 moves forward to eject the pit from one pocket, the plunger 26 of rectangular cross section large enough to engage the meat in another pocket, also advances through the rectangular slot 27 ejecting the meat from the pocket. From this it will be seen that the pit is first ejected by the plunger 17 and after traveling the space of two pockets, the meat is then ejected from the opposite side of the pocket by the plunger 26.

28 is a steam pipe having an outlet 29 in a line with the pockets 19 and is provided with a valve 30 connected to the rod 31 which is also attached to the lever 32 pivotally mounted in the bearing 33. One end of the lever 32 is provided with a pin or projection 34 adapted to engage the slot or openings 35 and the other end of the lever 32 is preferably provided with a suitable bearing on wheel 36. The face 37 of the cam 12 is elliptical so that upon each revolution of the cam 12, the lever 32 is swung upon the bearing 33 thereby operating the rod 31 which turns on the steam, the opposite end of the lever by the pin 34 locking the wheel 6 in position while the steam jets the pocket brought into position. This serves to moisten the pocket and prevent the fruit from sticking thereto. It will of course be understood that heat may be jetted or water or both or other means may be provided for preventing the fruit from sticking to the pockets. The plunger 17 may also be provided with a suitable brush such as 38 through which the plunger may travel and by which it may be kept clean from the sugar of the fruit and the same may be provided for the plunger 26.

Of course it will be readily understood that various modifications may be made without departing from the spirit of the invention as set forth in the claims.

We claim:

1. In a fruit pitting machine, a conveyer with pockets for carrying the fruit, a pair of plungers for ejecting the pits of said fruit, a pivoted carrier having said plungers on either side of its center, an actuating member connected to said carrier and adapted to oscillate said carrier, whereby said fruit plunger is driven into one of said pockets after said pit plunger has been driven into the same, and means for intermittently driving said conveyer and said plungers.

2. In a fruit pitting machine, a conveyer with pockets for carrying the fruit, a pair of plungers for ejecting the pits of said fruit, a pivoted carrier having said plungers on either side of its center, an actuating member connected to said carrier and adapted to oscillate said carrier whereby said fruit plunger is driven into one of said pockets after said pit plunger has been driven into the same, means for intermittently driving said conveyer and said plungers, and a pair of resilient jaws through which said pits are successively ejected, said jaws adapted to prevent the following of said fruit.

3. In a fruit pitting machine, a conveyer with pockets for carrying the fruit, a pair of plungers for ejecting the pits of said fruit, a pivoted carrier having said plungers on either side of its center, an actuating member connected to said carrier and adapted to oscillate said carrier whereby said fruit plunger is driven into one of said pockets after said pit plunger has been driven into the same, and means for intermittently driving said conveyer and said plungers, said carrier mounted upon the axis of said conveyer and oscillated thereupon by a cam adjacent to said conveyer.

4. In a fruit pitting machine, a conveyer with pockets for carrying the fruit, a pair of plungers for ejecting the pits of said fruit, a pivoted carrier having said plungers on either side of its center, an actuating member connected to said carrier and adapted to oscillate said carrier whereby said fruit plunger is driven into one of said pockets after said pit plunger has been driven into the same, means for intermittently driving said conveyer and said plungers, said carrier mounted upon the axis of said conveyer and oscillated thereupon by a cam adjacent to said conveyer, and means for driving said conveyer by said cam.

In testimony whereof we affix our signatures in presence of two witnesses.

HARRY STRACHAN.
GODFREY P. SCHMIDT.

Witnesses:
   WALTER F. KEENAN,
   PHILLIP WIEGAND.